Figure 1:
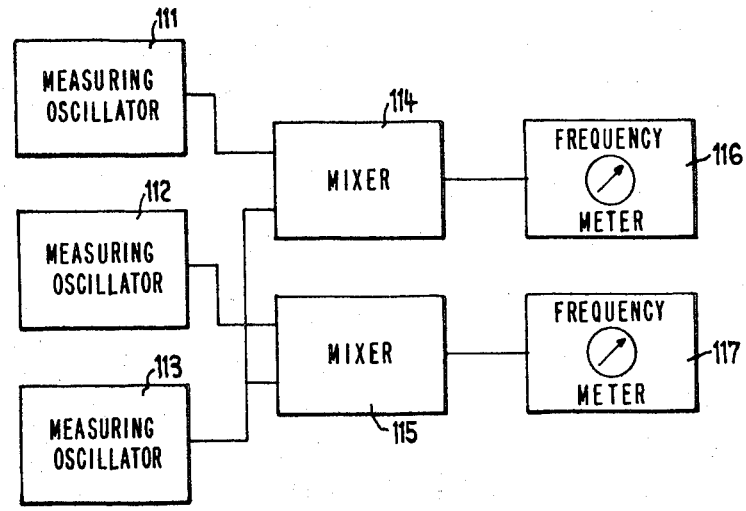

United States Patent [19]
Nopper et al.

[11] 3,815,017
[45] June 4, 1974

[54] BEAT FREQUENCY METHOD AND APPARATUS FOR MEASURING THE THICKNESS OF A LAYER OF MATERIAL OVERLYING A METALLIC SURFACE

[76] Inventors: Peter Nopper, Leuernweg 17, Bartholomausweg 16; Heinz Zumbach, 2500 Biel; Mathias Brunner, 2532 Magglingen, all of Switzerland

[22] Filed: Nov. 16, 1972

[21] Appl. No.: 307,248

Related U.S. Application Data
[63] Continuation of Ser. No. 28,228, April 16, 1970, abandoned, which is a continuation-in-part of Ser. No. 706,000, Feb. 16, 1968, abandoned.

[30] Foreign Application Priority Data
Feb. 23, 1967  Switzerland............... 2698/67
Aug. 11, 1967  Switzerland............... 11344/67

[52] U.S. Cl........... 324/34 R, 324/34 TK, 324/34 E
[51] Int. Cl............................................. G01r 33/00
[58] Field of Search............ 324/34 R, 34 TK, 34 E, 324/61 R, 61 P; 33/174

[56] References Cited
UNITED STATES PATENTS
| | | | |
|---|---|---|---|
| 2,581,394 | 1/1952 | Dinger | 324/34 TK |
| 2,872,640 | 2/1959 | Eppler | 324/61 R |
| 2,898,550 | 8/1959 | Fischer | 324/61 R |

FOREIGN PATENTS OR APPLICATIONS
| | | | |
|---|---|---|---|
| 761,241 | 11/1956 | Great Britain | 324/61 R |
| 832,635 | 4/1960 | Great Britain | 198/165 |

*Primary Examiner*—Robert J. Corcoran
*Attorney, Agent, or Firm*—Imirie & Smiley

[57] ABSTRACT

A method and apparatus for measuring the thickness of a layer or coating of a body, wherein coils of at least two oscillators are under similar control of spaced areas of one or more layers or coatings, differences of the thicknesses at said areas being determined by forming and measuring the beat frequency of at least two oscillator frequencies.

19 Claims, 8 Drawing Figures

BEAT FREQUENCY METHOD AND APPARATUS FOR MEASURING THE THICKNESS OF A LAYER OF MATERIAL OVERLYING A METALLIC SURFACE

This is a continuation of Ser. No. 22,228, filed April 16, 1970, and now abandoned, which was a continuation-in-part of Ser. No. 706,000, filed Feb. 16, 1968, and now abandoned.

It is known in the art to determine the thickness of a non-conducting layer or coating, for instance of an insulation of a metallic body by bringing the coil of an oscillating circuit determining the frequency of a high frequency oscillator into proximity of the surface of the layer or coating and to determine the thickness of the layer or coating from the influence of the metallic part below the layer onto the oscillator frequency. In prior measuring methods of this kind the oscillator frequency depending on the thickness of the layer to be measured has often been superposed with a constant auxiliary frequency, the thickness of the layer being thereby determined from the beat frequency. This measuring method tending to obtain an absolute measurement has many disadvantages and is practically unsuitable for important applications. Accurate measurement depends on an absolute stability of the measuring oscillator controlled by the thickness of the layer and of the auxiliary oscillator. However, it is practically impossible to meet with this requirement in all practical applications, for instance when checking continuous production of a cable or wire, because at least the measuring coil of the measuring oscillator determining the frequency of the measuring oscillator is subject to variable conditions, particularly variable temperatures. Therefore, accurate measurement would require continuous calibration of the measuring equipment.

It is an object of this invention to make use of the advantages of the above prior measuring method but to avoid its disadvantages. The method according to this invention broadly comprises similarly controlling at least two frequencies in accordance with the thickness of a layer or coating and determining differences of the thickness of the layer or coating from at least one beat frequency. Due to the fact that not an absolute measurement but a relative measurement by comparision is made, whereby all the frequencies to be superposed are similarly controlled, the drawbacks mentioned above are avoided. This invention is particularly suitable for testing continuous production, particularly of insulated cables or wires, where it is usually not necessary to check the absolute thickness of the insulating coating but its uniformity. With the measuring method according to this invention high stability of the measurement is obtained due to the similar control of all frequencies and at the same time high sensitivity is obtained due to the production and measurement of the beat frequency. Calibration of the system is extremely simple in that zero indication is to be adjusted without any calibration body, whereby this adjustment may be effected on the high-frequency side by adjustment of the frequency of at least one oscillator or on the direct-current output side of the frequency meter or discriminator.

This invention also relates to a measuring device for carrying out the above method, which broadly comprises at least two oscillators having each a coil in a frequency-determining circuit, a rest for a body to be tested being associated with each of said coils, at least one mixing stage for forming the beat frequency from the frequency of two oscillators, and a frequency meter following each of said mixing stages.

Figure 2:
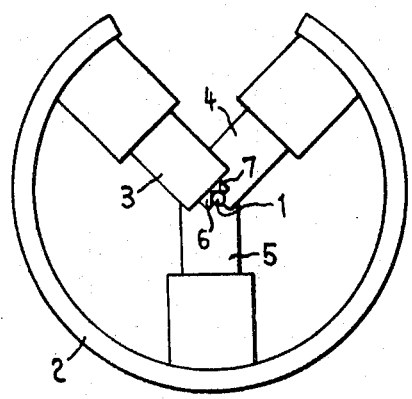
Figure 3:
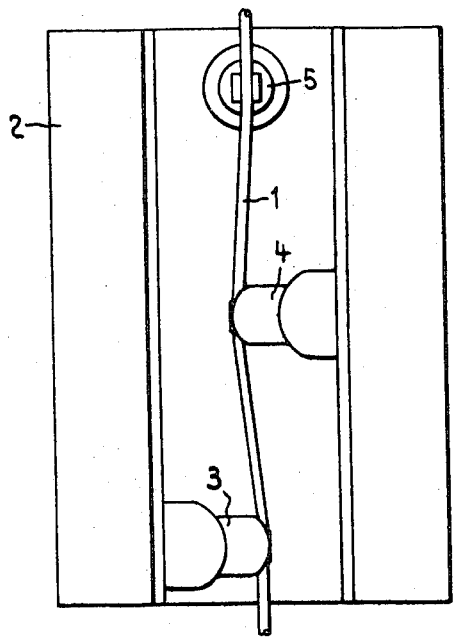
Figure 4:
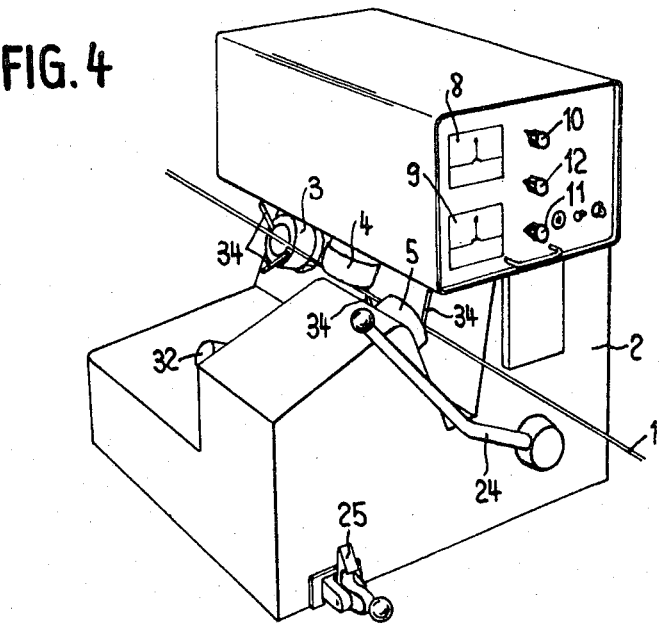
Figure 6:
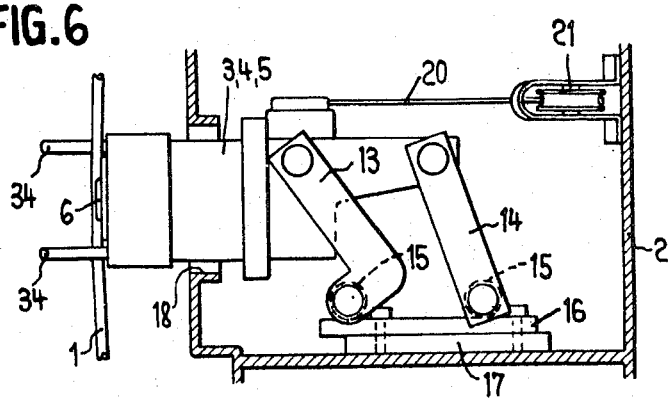
Figure 7:
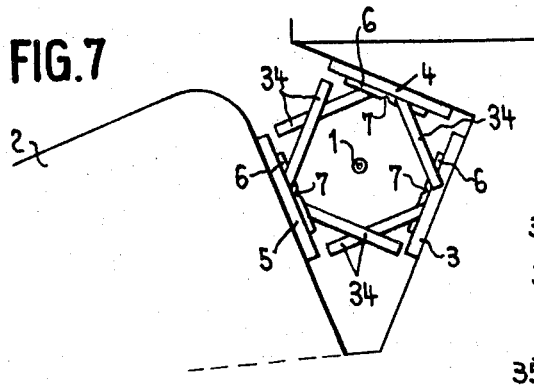
Figure 8:
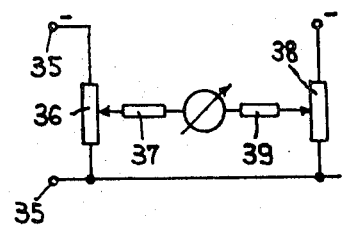
Figure 5:
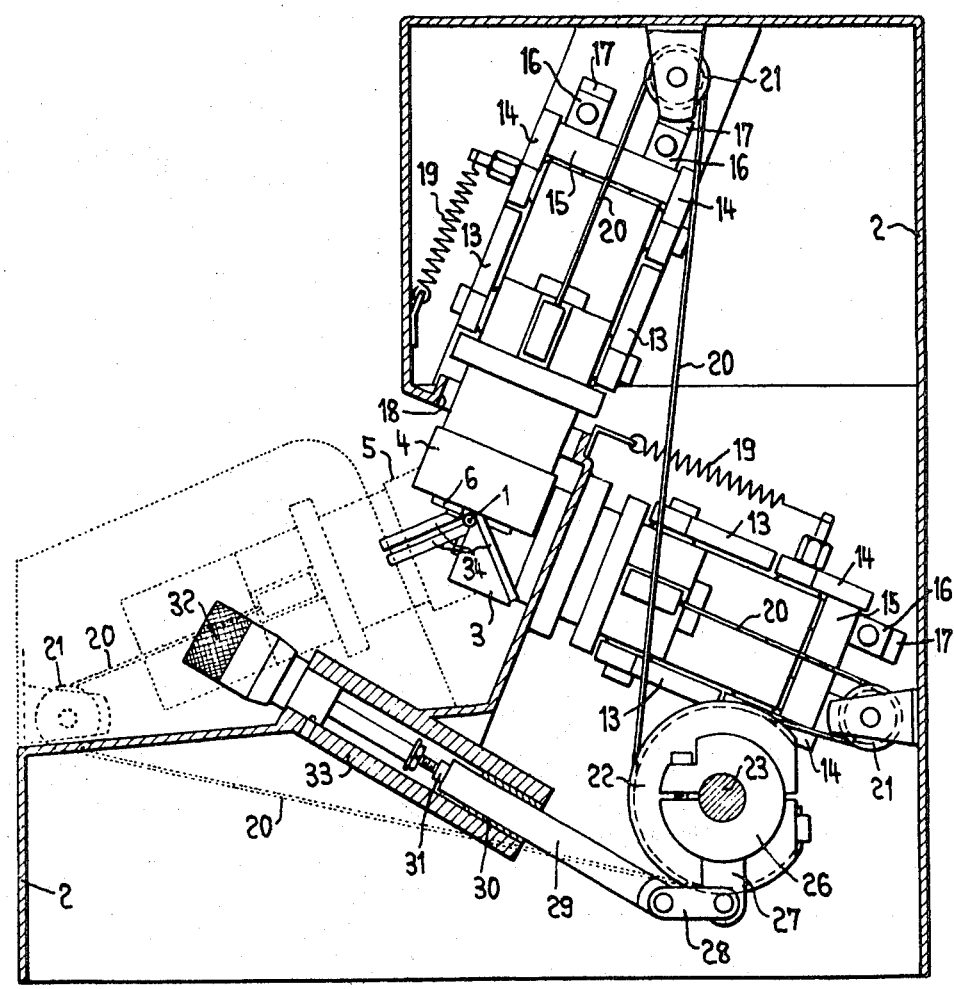

This invention will now be explained in detail with reference to the accompanying drawings showing two embodiments of a cable-test equipment and wherein FIG. 1 is a block diagram of the electric equipment, FIG. 2 is a diagrammatic end view of a first test device, FIG. 3 is a top view of the device of FIG. 2, FIG. 4 is a perspective view of a second test device, FIG. 5 is a cross section of the device of FIG. 4, FIG. 6 illustrates the suspension of a measuring unit in its casing, FIG. 7 illustrates a partial end view of the device with its measuring units in their calibration position and FIG. 8 illustrates the calibrating circuit of an indicating instrument.

The test device illustrated in FIGS. 1 to 3 has three measuring heads 3, 4 and 5 adjustably mounted in radial direction in tubular supports. These supports are mounted in a carrier open at its upper side and mounted on a suitable base, for instance on a casing not shown in the drawing and serving for accommodation of the electrical equipment described below. Each measuring head 3 – 5 has a rest plate 6 at its inner end, said rest plates 6 having each a groove 7 for receiving and guiding a cable or wire 1 running through the device in axial direction. The rest plates 6 and guide grooves 7 of all measuring heads project somewhat beyond the axis of the carrier 2 so that the cable or wire 1 runs through the device along a slightly zig-zag shaped path and is thus applied against the rest plates and into the grooves 7 respectively by the pull acting in the cable or wire. Such a disposition is only feasible when the measuring heads are also staggered in axial direction of the device or advancing direction of the cable or wire as shown in FIG. 3.

One of three similar measuring oscillators is accommodated in each of the measuring heads. A coil is located behind each of the rest plates 6, this coil being connected into an oscillating circuit determining the frequency of the oscillator. During operation of the oscillator, the magnetic field of its coil passes through the rest plate 6 which is preferably made of insulating material and enters into the cable passing over the rest plate, whereby the reaction of the cable conductor onto the coil field and on the coil inductivity respectively controls the oscillator frequency in a manner well known per se, the influence of the cable conductor depending on the distance between the latter and the measuring coil of the oscillator. This distance depends on the thickness of the cable insulation between the conductor and the rest plate of the measuring head. Consequently, the oscillator frequency is a measure for the thickness of the insulation at the area of the cable contacting the measuring head.

FIG. 1 schematically shows three measuring oscillators 111 – 113 associated each to one of the measuring heads 3 – 5. The outputs of the oscillators 111 and 112 associated to the measuring heads 3 and 4 circumferentially staggered by 90° are connected to one input of a mixing or heterodyn stage 114 and 115 respectively. The other inputs of these mixing stages are connected to the output of oscillator 113. The outputs of both mixers 114 and 115 are connected each to an evaulating circuit 116 and 117 respectively having each an indicating instrument. These evaluating circuits are frequency meters or discriminators of any conventional suitable type and need no further explanation. The same applies for the mixers and oscillators which may be of any conventional suitable design. It should only be mentioned that the indicating instruments of circuits 116 and 117 may be adjusted to zero without any measuring or calibrating body in order to properly indicate the value and direction of deviations of the nominal value as will be further explained below.

In the present case, where the measuring heads 3 and 4 are staggered by 90° and are symmetrically opposite to the reference measuring head 5 and staggered each by 135° relatively to the same, the measuring instruments indicate the deviation from the nominal value at two places staggered by 90° relative to the value measured at the symmetrically opposite place by the head 5. From these indications the value and direction of any irregularity, particularly of any excentricity of the coating may be determined with sufficient accuracy.

The oscillators 111 and 112 operate at the same frequency which is higher or lower than the reference frequency of the oscillator 113 by a sufficient value such that even with the greatest possible measuring values the beat frequencies at the outputs of the mixers 114 and 115 will never fail to zero. Preferably the beat frequency is in the order of 1 percent of the oscillator frequencies.

Operation of the measuring apparatus described above is as follows:

When the measuring heads are adjusted to a suitable radial position, and when suitable rest plates 6 have been inserted the instruments of the circuits 116 and 117 are adjusted to zero by means of the above calibrating means. The object to be tested, for instance a wire or cable is then inserted from above through the opening of the carrier 2 into the guide grooves of the rest plates 6. When the cable or wire is now advanced through the apparatus, for instance from a producing plant onto a take-up reel, the instruments are observed and the producing plant is so adjusted whenever necessary that the permissible irregularities in the thickness of the insulating coating will never occur. Adjustment of the producing plant may be effected by automatic means when the measuring results are computed into proper coordinate values suitable for control of the adjustment.

Another disposition of the measuring heads than as illustrated in FIGS. 2 and 3 is feasible. As an example, the measuring heads may be staggered by 120°. Four measuring heads staggered by 90° may be provided whereby the oscillator frequency of pairs of opposite measuring heads may be superposed. In this case the basic frequencies of two associated oscillators would have to differ slightly from each other, for instance by the above value of 1 percent. For measuring thick objects the measuring heads may be disposed in a common radial plane whereby they would not radially extend into the axis of the carrier 2.

The test device illustrated in FIGS. 2 and 3 may be used in any desired position with the opening of the carrier 2 on top or at the side and with the axis of the carrier in horizontal, vertical or inclined position.

The measuring method and device as described above, wherein a number of frequencies are similarly controlled in accordance with the thickness of the insulating coating at different places of the object to be tested, such frequencies are superposed by pairs and it is determined from the beat frequency or frequencies whether the coating has equal thickness in all places or not, offers outstanding advantages and possibilities for calibration of the device. Since all frequencies to be compared with each other are similarly controlled by the measuring object calibration is possible without a calibrating body, that is, when no differences are indicated without any influence on the frequencies by a measuring object it may be assumed that no differences will be indicated when all frequencies are similarly controlled by an object to be measured.

When measurements over long periods of time are effected under variable conditions, for instance temperatures, it is often desired to calibrate the device during the measurement. With the method and device according to this invention this may simply be achieved in that the influence of the object to be measured onto the oscillator frequencies is temporarily discontinued and calibration is effected under this condition. FIGS. 4 to 8 illustrate an embodiment of a measuring device particularly adapted for calibration as set out above, this device being characterized by means for lifting its measuring heads or units off the object to be tested and by calibrating means for calibration of the indication or reading. It is thus possible to lift the measuring units off the test object running through the device at any time during the measurement in order to calibrate the device if necessary, whereafter the measuring units may again be applied against the object to be tested.

FIG. 4 illustrates the testing device in its measuring position, whereby an object 1 to be tested, for instance a cable or an insulated wire runs through the device. Measuring units 3, 4 and 5 similar to the measuring heads or units 3, 4 and 5 of FIGS. 2 and 3 are disposed in circumferentially and axially staggered relation. Each of the measuring units has a rest plate 6 with a V-groove 7 for supporting and guiding the measuring object 1. Measuring circuits similar to those shown in FIG. 1 and not shown in FIG. 4 are accommodated in an upper part of the casing. Two indicating instruments 8 and 9 are mounted at the one end surface, and one of two operating knobs 10 and 11 respectively of calibrating potentiometers are associated with each instrument 8 and 9. The operating knob 12 of another twin potentiometer serves for adjustment of the sensitivity of both indications.

As shown in FIGS. 5 and 6 the measuring units 3, 4 and 5 are each mounted in the casing by means of a parallelogram suspension having parallelogram arms 13 and 14. The lower joints of arms 13 and 14 are formed by screws fixed in cylinders 15 welded to a plate 16. This plate 16 is screw fastened on webs 17 welded to the wall of the casing. The measuring units 3, 4 and 5 extend through openings 18 of the casing with clearance so that such units may be adjusted not only in radial direction but also transversely thereto.

A tension spring 19 is attached to each measuring unit, tending to shift the unit into the measuring position illustrated in FIGS. 4 to 6. This position is determined by a wire cable 20 attached to each of the units, each cable 20 passing over a return pulley 21 and being clamped with its other end to a disc 22. All discs 22 associated each to one of the units 3 to 5 are fixed on a common shaft 23 extending through the front wall visible in FIG. 4, and carrying a handle 24 at its projecting end. A spring-loaded latch 25 is disposed at the front side of the casing within reach of the path of the handle 24 for automatically locking the handle in a lower end position.

An arm 27 is fixed to the shaft 23 by means of a hub 26, this arm being coupled with a plunger 29 by means of a link 28. The plunger 29 is axially displaceable in a sleeve 30. In the measuring position shown in FIG. 5 the free end surface of the plunger 29 abuts against a stop screw 31 adjustable by means of a screw 32. This adjusting and stop device is accommodated in a tube 33 welded to the casing.

Each of the measuring units has catching arms 34 at each side of the rest plate 6.

FIG. 8 illustrates the calibrating circuit associated to one of the indicating instruments, for instance instrument 8. The input terminals 35 of this circuit are connected to the direct-current output of the frequency meter or discriminator to which is applied to one beat frequency of two measuring units. Therefore, a direct-current potential appears at terminals 35 depending on the beat frequency of two heterodyned oscillator frequencies. A potentiometer 36 is connected to the input terminals 35 and the tapping of potentiometer 36 is connected with the indicating instrument 8 through a resistor 37. In the compensating circuit a direct potential source not shown in the diagram is connected to a potentiometer 38 of which the tapping is connected to the instrument 8 through a resistor 39. The output of the frequency meter or discriminator is similarly polarized as the potential source such that the instrument may be adjusted to zero position (FIG. 4) by adjustment of the potentiometer 38 such that the tapping of potentiometer 38 is at the same potential as the tapping of potentiometer 36. The sensitivity of the indicating may be adjusted by means of potentiometer 36.

Operation of the embodiment shown in FIGS. 4 to 8 is as follows: In the measuring position shown in FIGS. 4 to 6 the object to be measured is applied into the guiding grooves 7 of the rest plates 6 as described above with reference to FIGS. 2 and 3. Before inserting the object 1 the device has been calibrated by adjusting both instruments 8 and 9 to zero position. As stated above, the potentiometer 38 is so adjusted by means of its actuating knob 10 that the compensation potential is equal to the output potential of the discriminator. After calibration the measurement may begin. When substantial variations of the ambient conditions, for instance of the temperature of the measuring units occur during the measurement, or when it must be assumed for other reasons that the device is no longer calibrated, a new calibration may be effected at any time. To this end the handle 24 is swung down from its measuring position shown in FIG. 4 and is locked in lowered position by latch 25. Shaft 23 is rotated with the handle in anticlockwise direction whereby all cables 20 are wound onto the discs 22 and the measuring units are pulled back into the position shown in FIG. 7 and are spaced from the measuring object 1 by a distance for which the object has no influence whatever on the measuring units, that is on the frequency of the measuring oscillators. When the measuring units are in this spaced calibrating position, the instruments may be calibrated as explained above, if necessary. This calibration takes very little time and as soon as it is completed, the latch 25 is manually disengaged and the handle 24 is released into its upper position as illustrated. During this displacement the plunger 29 which has been spaced from the stop 31 during the previous anticlockwise rotation of the shaft 23, is now returned into its end position as illustrated whereby the original measuring position of all parts, particularly of the measuring units 3 to 5 is restored. When the measuring units are reset into their measuring position their catching arms 34 catch the measuring object 1 and guide it back into the grooves 7 of the associated rest plates 6. The time interval during which the measuring units 3 to 5 are spaced from the measuring object 1 for checking the calibration and readjustment of the same is relatively short, and under normal conditions it is impossible that irregularities which must be indicated might occur in the production during this time interval.

The possibility of retracting the measuring units from their measuring position into an inoperable position does not only allow a short-time calibration as explained above but may substantially facilitate insertion of a new measuring object which must only be inserted between the catching arms of all measuring units and will automatically be inserted into the grooves 7 when the units are reset into their measuring position. The measuring position of units 3 – 5 may be adapted to the diameter of the object to be tested in a very simple manner by adjustment of the stop screw 31 by means of the adjusting screw 32.

In the foregoing description it has been assumed that the pull of the springs 14 and abutment of the plunger 29 against the stop screw 31 positively determine the measuring position of the measuring units 3, 4 and 5 and that the flexible test object adapts itself to these positions by assuming the zig-zag shape mentioned above. However, no such adaptation of the measuring object may be expected with thick and stiff objects such as cables, and in such a case the measuring units will advance under the pull of springs 19 and will elastically be applied against the surface of the practically rigid object. Their position is no longer determined by the stop 31. However, it is also feasible to mount the measuring oscillators with their measuring coils for axial displacement within the casings of the units 3, 4 and 5 and to provide springs between the casings and displaceable oscillators and coils for applying the latter against the object to be tested. In this case, the position of the casing of each measuring unit is always determined by the stop 31 while the measuring unit itself is applied against the object to be measured by spring action.

Instead of effecting calibration by means of two circuits of the type shown in FIG. 8, calibration of the device may also be obtained by adjustment of at least one of the oscillator frequencies, for instance by adjustment of a trimmer in the oscillating circuit containing the measuring coil.

This invention is not limited to the measuring of cables, wires, tubes or similar cylindrical bodies. As an example it is possible to test the regularity of the coating of sheet material, for instance of the coating of plastics material on a metal sheet or of a tape of sheet material, for instance a web of paper. The invention is not limited to the checking of long objects running through a test apparatus, particularly in producing plants, but separate parts may be tested which are successively brought into a predetermined position relatively to the test apparatus. If the thickness at a single relatively small area of a body is to be measured, a first measuring head may be applied to the area to be measured and a second similar measuring head may simultaneously be applied against a calibrated body. It is determined from the value of the beat frequency formed of both measuring frequencies whether the thickness of the layer of the tested body differs from the nominal value of the calibrated body or not.

What we claim is:

1. A method for measuring the thickness of a layer of insulation of a conductive cable comprising bringing first, second and third measuring coils into measuring positions proximate to said layer at circumferentially staggered positions relative to each other about the cable, said first and second coils being staggered at 90°, said third coil being staggered at 135° relative to each of the other coils, each of the said measuring coils being connected into an oscillating circuit determining the frequency of the measuring oscillator, the frequency of each oscillator being thereby shifted by interaction of each coil with the metallic portion of said cable in accordance with the thickness of the coating insulation in the measuring range of each coil; forming the beat frequency of each of the said first and second oscillators with the frequency of the third oscillator and indicating the differences of the insulating coating from both beat frequencies thereby obtained; and periodically spacing said measuring coils from their measuring positions into calibrating positions at a distance from the said metallic part and calibrating said beat frequencies with respect to said differences in thickness.

2. Apparatus for indicating variations in thickness of a layer of material overlying a metallic surface comprising:
   a. first and second inductive test coils respectively disposed in first and second oscillatory circuits;
   b. means to position and support said coils proximate to said layer whereby to shift the outputs of said first and second oscillatory circuits in accordance with the thickness of said layer at the points of positioning;
   c. an inductive reference coil disposed in a reference oscillatory circuit;
   d. means to position and support said reference coil proximate to said layer;
   e. first and second mixer means, each connected to the output of said oscillatory reference circuit and respectively connected to the outputs of said first and second oscillatory circuits, for generating first and second beat frequency outputs;
   f. means connected to said first and second mixer means for providing first and second DC level signals in accordance with said first and second beat frequency outputs;
   g. means for periodically removing said first, second and test coils from the proximity of said layer to calibrate said apparatus; and
   h. means for establishing the levels of said DC outputs with said coils removed from the proximity of said layer to thereby establish reference levels, the departure from which is indicative of the thickness variations in said layer.

3. Apparatus in accordance with claim 2 wherein the means for establishing the reference levels comprises bridge circuits for receiving said DC outputs, said bridge circuits including current indicator means and adjustable nulling means for nulling the bridge current in accordance with said DC levels when said first, second and test coils are removed from the proximity of said layer, whereby subsequent unbalancing of said bridge circuits when said coils are in proximity of said layer being tested, is indicative of variations in thickness of said layer.

4. Apparatus in accordance with claim 3 wherein said coils are in circumferentially staggered positions with respect to one another, said apparatus being thereby adapted to inspect the uniformity of the insulating coating provided on a cable or wire about which said coils are staggered.

5. Apparatus in accordance with claim 4 wherein said first and second coils are in positions staggered by 90° with respect to one another, and said reference coil is staggered by 135° relative to said first and second coils.

6. Apparatus in accordance with claim 4 wherein said oscillators, coils and positioning and support means are parts of measuring heads displaceable each against the body to be tested, and further including actuating means for effecting common displacement of the measuring heads from measuring into calibrating positions.

7. Apparatus for indicating variations in thickness of a layer of material overlying a metallic surface comprising:
   a. at least two inductive test coils respectively disposed each in an oscillatory circuit;
   b. guide means and an actuating mechanism to position and support said coils proximate to said layer so as to shift the outputs of said oscillatory circuits in accordance with the thickness of said layer at the points of positioning;
   c. mixer means connected to the outputs of said oscillatory circuits and having beat frequency output means;
   d. means connected to said mixer means for providing DC signals in accordance with said beat frequency output means;
   e. said guide means and actuating mechanism operable for simultaneously withdrawing all said test coils from the proximity of said layer to positions spaced from inductive interference with said metallic surface such that the outputs of said oscillatory circuits are unaffected by said layer or said metallic surface for enabling calibration of said apparatus without removing said layer or said surface, and for subsequently shifting said coils back towards said layer; and
   f. means for calibrating said apparatus by establishing the level of said DC output signals with said coils removed from the proximity of said layer to said spaced positions to thereby establish reference levels, the departure from which is indicative of the thickness variations in said layer.

8. An apparatus according to claim 7, comprising displaceable measuring units including each one of said test coils, said actuating mechanism including means for common displacement of said measuring units along said guide means for approaching said measuring units towards said layer and removing them from said layer.

9. An apparatus according to claim 8, for testing an elongated, cylindrical object, for instance a cable, wherein said measuring units are mounted on guide means extending radially from the axis of said object in positions circumferentially staggered round the object.

10. An apparatus according to claim 8, wherein each measuring unit is maintained in its measuring position approached to the layer by spring action, the measuring position of all units being determined by a common stop of the actuating mechanism.

11. An apparatus according to claim 10, wherein said actuating mechanism has a shaft with a handle, said shaft being coupled with said measuring units by pulling cables, and the angular displacement of said shaft towards its measuring position being determined by an adjustable stop.

12. An apparatus according to claim 11, comprising a disengageable latching device for the shaft and its handle respectively for latching the shaft in its calibrating position.

13. A device according to claim 10, wherein said measuring units have catching arms for catching the object to be tested.

14. A device according to claim 10, wherein each measuring unit is mounted in a casing by means of a parallelogram suspension.

15. An apparatus according to claim 7, wherein said means for establishing the level of said DC output comprise a compensating circuit wherein the output of said mixer means and a circuit including a comparing-potential source are connected in parallel to the indicating instrument, whereby variable calibrating resistors are connected into both parallel circuits.

16. An apparatus according to claim 11, wherein each of said measuring units is spring-mounted in a casing which is maintained in its measuring position by spring action.

17. An apparatus according to claim 7, comprising means for frequency adjustment of at least one of said oscillatory circuits.

18. Apparatus for testing the uniformity of the insulating layer of cables having a conductor inside said insulating layer, comprising a passageway for said cable, inductive test coils disposed in circumferentially staggered positions round said passageway, each of said test coils being connected into an oscillatory circuit for determining the frequency of this oscillatory circuit, guide means and an actuating mechanism for displacing said test coils in directions substantially radial relative to an axis of said passageway and cable running therethrough, respectively, to position and support said coils proximate to said layer whereby to shift the outputs of said oscillatory circuits in accordance with the thickness of said insulating layer at the points of positioning and to periodically remove said test coils from said cable to positions spaced from inductive interference therefrom, mixer means connected to the outputs of said oscillatory circuits and having beat frequency output means, means connected to said mixer means for providing DC signals in accordance with said beat frequency output means, and balancing means for zeroing said DC signals when said test coils are removed from said cable.

19. A method for indicating variations in thickness of a layer of material overlying a metallic surface comprising:
a. providing at least two inductive test coils respectively disposed each in an oscillatory circuit;
b. positioning and supporting said coils proximate to said layer whereby to shift the outputs of said oscillatory circuits in accordance with the thickness of said layer at the points of positioning;
c. mixing the outputs of said oscillatory circuits for producing a beat frequency;
d. producing DC signals in accordance with said beat frequency;
e. simultaneously withdrawing all said test coils from the proximity of said layer to positions spaced from inductive interference with said metallic surface and zeroing said DC signals, and subsequently shifting all said test coils back towards said layer; and
f. establishing the level of said DC output signals with said coils proximate to said layer, the departure of such levels from said zeroed DC signals being indicative of the thickness variations in said layer.

* * * * *